United States Patent [19]

Joshi

[11] Patent Number: 4,860,533
[45] Date of Patent: Aug. 29, 1989

[54] TORCH IGNITER FOR A COMBUSTOR HAVING U.V. FLAME DETECTION

[75] Inventor: Narendra D. Joshi, Phoenix, Ariz.

[73] Assignee: Prutech II, San Jose, Calif.

[21] Appl. No.: 97,676

[22] Filed: Sep. 17, 1987

[51] Int. Cl.[4] ............................................. F02C 7/264
[52] U.S. Cl. ................................ 60/39.06; 60/39.826; 431/79
[58] Field of Search ............. 60/39.06, 39.826, 39.821; 431/79

[56] References Cited

U.S. PATENT DOCUMENTS

| | | | |
|---|---|---|---|
| 2,295,045 | 9/1942 | Mettler | 431/79 |
| 3,324,926 | 6/1967 | Jakobi | 431/79 |
| 3,486,835 | 12/1969 | Grohe | 431/79 |
| 3,825,913 | 7/1974 | Metcalf et al. | 431/79 |
| 3,990,835 | 11/1976 | Burton III | 431/79 |
| 4,192,139 | 3/1980 | Buchheim | 60/39.826 |
| 4,547,145 | 10/1985 | Jahnke | 431/79 |

Primary Examiner—Donald E. Stout
Attorney, Agent, or Firm—Cushman, Darby & Cushman

[57] ABSTRACT

A gas turbine combustor is ignited by a torch igniter. The ignition chamber of the torch igniter receives a swirled stream of air into which is injected atomized fuel. The mixture of fuel and air is ignited by a spark plug in the ignition chamber. The combustion products and igniter flame are exhausted from the ignition chamber through a gas passageway penetrating through the sidewall of the gas turbine combustor to ignite a flame in the combustor. The igniter flame and the combustion flame are detected by a U.V. detector looking through aligned igniter air inlet and igniter exhaust passageways into the combustor. A U.V. transmissive window is disposed in the air inlet passageway to isolate the detector from the pressure of the igniter and combustor. A swirler in the air inlet tubulation supplies a flow of air across the window to inhibit deposit of combustion products thereon.

16 Claims, 1 Drawing Sheet

TORCH IGNITER FOR A COMBUSTOR HAVING U.V. FLAME DETECTION

BACKGROUND OF THE INVENTION

The present invention relates in general to torch igniters for igniting the main flame in a combustion chamber and, more particularly, to such an igniter including a U.V. flame detector for detecting the existence of both the main combustor flame and the torch igniter flame.

DESCRIPTION OF THE PRIOR ART

Heretofore, torch igniters have been employed for igniting the main combustion flame in a combustion chamber. In addition, U.V. flame detectors have been employed for detecting the presence of the flame in the combustor. In these prior art systems, the wall of the main combustion chamber was pierced in at least two locations; one for the torch igniter and the other for the U.V. flame detector. It would be desirable to provide a combined torch igniter and U.V. flame detector such that the U.V. flame detector could detect both the torch flame and the main combustor flame with only a single penetration of the combustion chamber.

SUMMARY OF THE PRESENT INVENTION

The principal object of the present invention is the provision of an improved torch igniter for igniting the main flame of a combustor and such igniter including a U.V. flame detector for detecting both the presence of the torch flame and the main combustor flame.

In one feature of the present invention, a U.V. flame detector is operatively associated with the torch igniter so as to observe both the torch flame and the main combustion flame through the torch igniter flame passageway passing through the wall of the combustion chamber, whereby both the torch flame and the main combustion flame may be detected with only single penetration of the wall of the combustion chamber.

In another feature of the present invention, the combustor is a turbine combustor operating above atmospheric pressure and a U.V. transmissive pressure-tight window is provided between the U.V. detector and the torch igniter for isolating the pressure of the torch igniter from that of the U.V. detector.

In another feature of the present invention, the air supplied to the torch igniter is passed through a swirler for stabilizing the flame of the torch igniter and for passing a portion of the torch air over the U.V. transmissive window to inhibit formation of combustion products on the window.

In another feature of the present invention, the ignited combustor flame is detected by shutting off the flow of fuel to the torch igniter for detecting the existence of the ignited main combustion flame, free of interference of the torch flame.

Other features and advantages of the present invention will become apparent upon a perusal of the following specification taken in connection with the accompanying drawings wherein:

BRIEF DESCRIPTION OF THE DRAWING

The drawing is a longitudinal cross-sectional view, partly in block diagram form, of a gas turbine combustor ignited by a torch igniter incorporating features of the present invention

DESCRIPTION OF THE PREFERRED EMBODIMENTS

Figure 1:
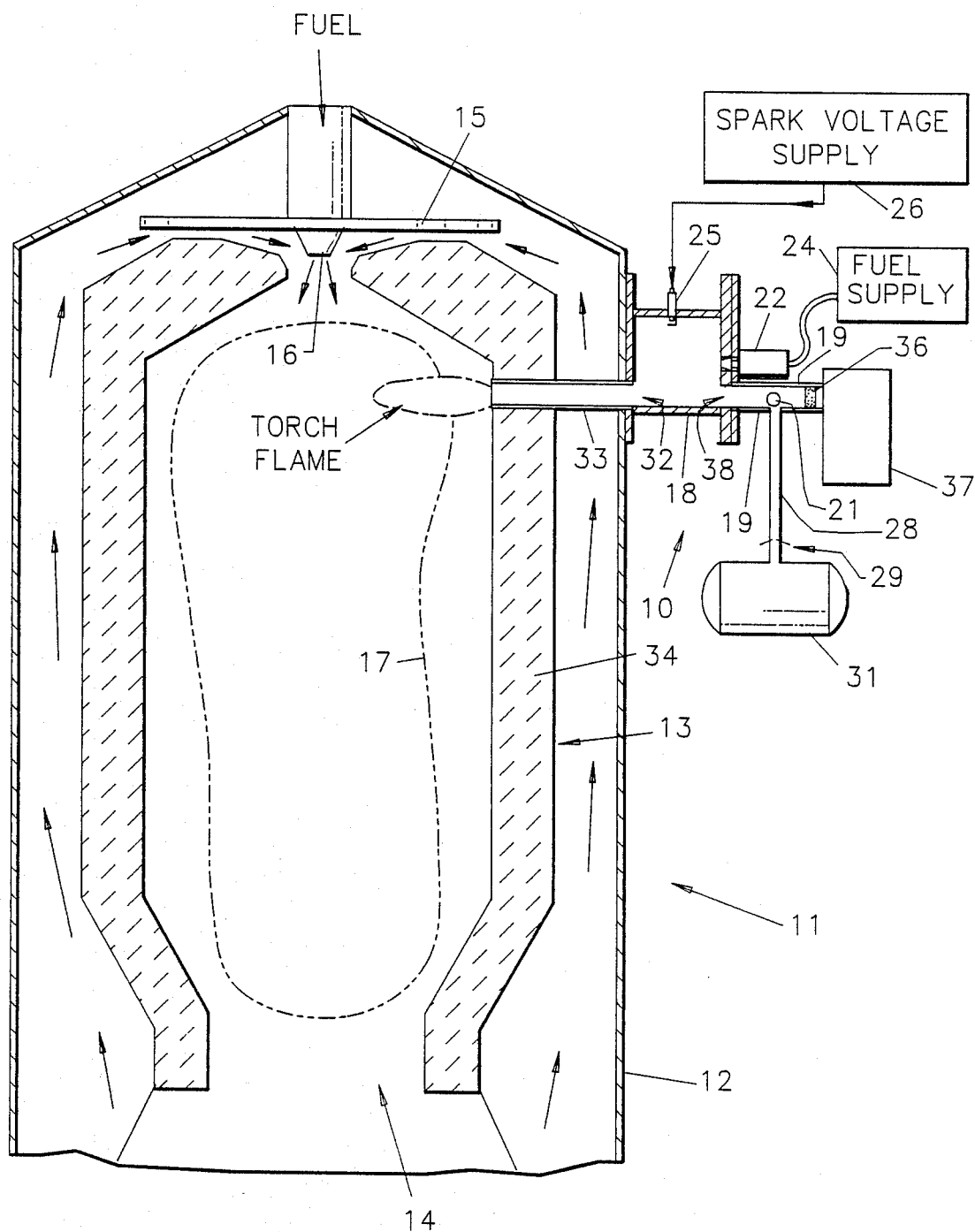

Referring now to the drawing, there is shown the first stage of a two-stage gas turbine combustor 11 incorporating a torch igniter 10 employing features of the present invention.

The combustor 11 includes an outer can 12, as of stainless steel, supporting therewithin a first stage combustion chamber 13 for containing therewithin the first stage of combustion in which a fuel-rich mixture is burned with the combustion products being exhausted through a narrow throat portion 14 into the second stage of the combustor in which fuel-rich combustion products, resulting from the first stage of combustion, are mixed with secondary air and the combustion process completed. The combustion products are exhausted from the second stage to the turbine of the gas turbine.

Compressed air is fed into the combustor from the bottom through an annulus defined between the first and second combustion chambers and the outer can 12 of the combustor. The compressed air is derived from the output of the compressor stage of the gas turbine and is conducted into the combustion chamber 13 at the upper end through a swirler 15 which imparts a substantial swirl to the air entering the combustion chamber 13 where it is mixed with fuel sprayed into the swirling airstream by means of a nozzle 16.

The swirling mixture of fuel and air is ignited within the combustion chamber 13 by means of the torch igniter 10 which shoots a torch flame into the combustion chamber 13 proximate the swirler and fuel nozzle 16. The ignited flame in the first stage of the combustor fills essentially the entire combustion chamber as indicated at 17.

The torch igniter 10 includes a cylindrical ignition chamber 18 carried from the outer can 12 of the combustor 11. Combustion air for the igniter is inducted into the ignition chamber 18 through an inlet pipe 19. The igniter air is fed into the pipe 19 by means of a swirler 21 which causes the air to form into a vortex and flow into the ignition combustion chamber 18 where the vortex expands and is mixed with atomized fuel injected into the ignition chamber 18 by means of an atomizer 22. The atomizer 22 includes an atomizing nozzle. The atomizer is supplied with fuel from a fuel supply 24 at a substantial pressure, as of 100–200 psi. A spark plug 25 is mounted through a hole in the wall of the cylindrical ignition chamber 18 and the spark plug 25 is supplied with spark voltage from a supply 26.

The ignition air is supplied to the swirler 21 by means of a tubulation 28 containing a choked orifice 29. Air is supplied to the tubulation 28 and choked orifice 29 from the tank 31 of an air compressor at a substantial pressure as of 200 psi. The choked orifice 29 serves to provide a constant flow of torch ignition air as of one standard cubic foot per second regardless of the back pressure on the choked orifice.

The ignition chamber 18 includes an exhaust port 32 through which the flame and combustion products of the torch igniter exhaust from the ignition chamber 18 through an exhaust tubulation 33 penetrating a refractory insulative liner 34 of the combustion chamber 13. In a typical example, the exhaust tubulation 33 is made of stainless steel or ceramic and has an overall length of approximately 6" with the torch flame extending into the combustion chamber by an extent of approximately 8".

A gas-tight ultraviolet (U.V.) window 36 is sealed across the interior of the air inlet tubulation 19 and a U.V. detector 37 is disposed outside the window 36 for detecting U.V. radiation emanating from the torch flame and from the ignited combustor flame. In a typical example, the air inlet tubulation 19 has an axial length of approximately 2" and the ignition air is inducted into the tubulation essentially midway of its length so that one vortex flows into the ignition chamber, whereas another vortex flows axially to the window 36 wherein it is reversed and reduced in diameter and passes axially through the center of the vortex into the ignition chamber 18 through an air inlet port 38. The air inlet tubulation 19 is in axial alignment with the torch exhaust tubulation 33 to provide a line-of-sight through the aligned tubulations to the combustor flame zone and the torch flame zone within the combustor.

In operation, a starter motor drives the compressor stage sufficiently to provide between one and two atmospheres of air to the swirler 15 wherein it is swirled and inducted into the combustion chamber 13. In addition, atomized fuel is injected and mixed with the swirling air in the combustion chamber 13. Meanwhile, ignition air is supplied via the swirler 21 and inlet port 38 into the ignition chamber 18 where it is mixed with atomized fuel injected through the atomizer 22 into the ignition chamber 18. The mixture of fuel and air in the ignition chamber 18 is ignited by a rapid sequence of sparks supplied by the spark plug 25. The sparks, supplied by the spark plug 25, are of a sufficiently rapid repetition rate so as to provide essentially a continuous ignition of the igniter flame in the ignition chamber 18. The igniter flame and combustion products are exhausted from the ignition chamber 18 via exhaust port 32 and exhaust tubulation 33 into the combustion chamber 13 for igniting the combustor flame. As the combustor flame is ignited, its combustion products are exhausted to the second stage of the combustor and thence into the turbine of the gas turbine so as to drive the compressor, and the air pressure fed to the combustion chamber 13 rapidly increases to, on the order of, 10-13 atmospheres.

The U.V. flame detector 37 detects, at first, the flame in the torch igniter itself due to U.V. radiation emitted by radicals only generated in flames. Once the torch igniter 10 has been switched off, by turning down the torch igniter fuel to zero flow, and turning off the spark plug 25, the U.V. detector 37 can detect U.V. radiation emanating from the flame in the main combustion chamber 13. The exhaust tubulation 33 and air inlet tubulation 19 are arranged in coaxial alignment to allow the U.V. detector 37 a line-of-sight view of the flame in the main combustion chamber through the U.V. transmissive window 36. Carbon formation on the quartz window 36 of the U.V. flame detector is inhibited by continuous purging of the torch igniter with the continuous flow of air from the air compressor tank 31. In a typical example, the torch igniter runs 30 seconds and then is turned off. The U.V. detector samples the torch flame during the time that the torch is on, and, after the torch has been extinguished, it detects the ignited flame in the combustion chamber.

In a typical physical realization of the igniter 10, the ignition chamber 18 has an inside diameter of 3.25" and an axial length of 3". The air inlet tube 19 and the exhaust tubulation 33 each have an inside diameter of 0.75". The U.V. detector 37 is a model 43085-00012, commercially available from Armtec of Manchester Airport, Manchester, New Hampshire. The spark plug 25 is a model D89-D from Champion. The fuel atomizer 22 is a model PLP commercially available from Monarch Mfg., of Philadelphia, Pennsylvania providing 0.5 gals. per hr. of fuel. The swirler 21 provides a swirl flow for entry into the ignition chamber 18, having a swirl number falling within the range of 5-20.

The advantages of the torch igniter 10 of the present invention include the provision of a stable ignition torch flame for igniting the flame of the combustor while also providing U.V. detection of the torch flame and of the ignited combustor flame with only a single penetration of the wall of the main combustion chamber 13. In addition, the window for the U.V. detector is continuously purged and scrubbed by means of the swirled air inducted into the igniter 10.

What is claimed is:

1. In a method for torch igniting a gas turbine combuster operating at above atmospheric pressure and for detecting the existence of flame in a torch igniter and of flame in the ignited combustor by a single detector, the steps of:
   flowing a stream of torch air through the wall of a refractory insulated combustion chamber into a combustion zone within the combustion chamber;
   mixing torch fuel into the stream of torch air flowing into the combustion chamber;
   selectively igniting the stream of torch air mixed with torch fuel to provide a torch flame for igniting a combustion flame in a mixture of air and fuel within the combustion zone of the combustion chamber; and
   detecting at said single detector, U.V. radiation emanating from the torch and combustor flame, such radiation passing back through the torch stream of air flowing into the combustion chamber to derive an output representative of the existence of at least one of said torch and combustor flames.

2. The method of claim 1 including the steps of passing the U.V. radiation emanating from aid torch and combustor flames through a gas-tight U.V. radiation transmissive window to said U.V. sensitive detector; and
   scrubbing the combustion side of the window with a flow of air to inhibit formation of deposits on the window which would otherwise tend to attenuate transmission of U.V. radiation through the window.

3. The method of claim 2 including the step of:
   swirling the flow of torch air in a fluid passageway containing said window for scrubbing said window with the swirling flow of torch air.

4. The method of claim 3 including the step of inducting and expanding the swirled flow of torch air into an ignition chamber disposed downstream of said U.V. window; and
   wherein the step of mixing torch fuel and torch air includes mixing the torch fuel and torch air in the ignition chamber; and
   wherein the step of selectively igniting the mixed stream of torch fuel and torch air includes selectively igniting the expanded swirled flow of torch air and fuel in the ignition chamber to produce the torch flame.

5. The method of claim 4 including the step of:
   exhausting the combustion products and torch flame from the ignition chamber as said stream of air flowing through the wall of the combustion chamber into the combustion zone.

6. The method of claim 5 including the step of:
shutting off the torch flame in the ignition chamber to detect essentially only U.V. radiation emanating from the combustion flame, if any, for detecting the existence of the combustor flame.

7. The method of claim 6 wherein the step of shutting off the torch flame includes the step of shutting off the flow of torch fuel through the torch igniter chamber while maintaining a swirling flow of torch air over the U.V. transmissive window and through the ignition chamber to the combustion chamber.

8. In a torch igniter for producing a torch flame for igniting a combustor flame in a gas turbine combustor operating at above atmospheric pressure and for detecting the existence of the torch flame and of the combustion flame in the ignited combustor by a single detector:
a torch ignition chamber for containing a mixture of torch fuel and torch air;
ignition means for igniting a mixture of torch fuel and torch air in the ignition chamber means;
torch air supply means for supplying a stream of air to said ignition chamber means;
exhaust means for exhausting the combustion products and torch flame from said ignition chamber means through the wall of a refractory insulated combustion chamber and into a combustion zone of the combustion chamber; and
a single ultraviolet radiation detector means operatively associated with the torch igniter for detecting ultraviolet radiation emanating from the torch flame and the ignited combustion flame in the combustion chamber, whereby the existence of the torch and combustion flames are detectable by said single ultraviolet radiation detector means.

9. The torch igniter of claim 8 further Comprising:
window means disposed in the path of the detected U.V. radiation emanating from said igniter and combustion flames for isolating said U.V. detector means from the elevated pressure of said combustor and for passing the U.V. radiation therethrough to said detector means.

10. The torch igniter of claim 9 including:
conduit means for flowing a portion of air supplied by said torch air supply means over said window means for inhibiting deposition of combustion products on said window means.

11. The torch igniter of claim 10 including:
swirler means for swirling the flow of air in said conduit means so that the portion of the air caused to flow over said window means is caused to be swirled across said window to assist in inhibiting deposition of combustion products on said window means.

12. The torch igniter of claim 8 including:
swirler means for swirling the stream of air supplied from said torch air supply means to said ignition chamber for swirling the air in said ignition chamber to stabilize the torch flame in said ignition chamber and to stabilize the torch flame in said exhaust means.

13. In a torch igniter for igniting a flame in the combustion chamber of a gas turbine combustor operating at above atmospheric pressure:
a torch ignition chamber for containing a mixture of fuel and air;
said ignition chamber including an exhaust port for exhausting flame and combustion products from said ignition chamber into the combustion chamber of the combustor for igniting a flame in the combustion chamber;
said ignition chamber including an air inlet port for inducting a flow of air into said ignition chamber;
a swirler for swirling the flow of air inducted into said ignition chamber through said air inlet port;
a fuel atomizer for inducting an atomized stream of fuel into said ignition chamber for mixing therein with the swirled air stream inducted through said air inlet port;
a spark plug having an electrical spark gap disposed within said ignition chamber for igniting a flame within said swirled mixture of air and fuel within said ignition chamber;
a single U.V. detector mechanically and optically operatively associated with the torch igniter for detecting ultraviolet radiation emanating from the igniter flame and the ignited flame in the combustion chamber.

14. The torch igniter of claim 13 including gas-tight U.V. radiation transmissive window disposed on the axis of propagation of the detected U.V. radiation for isolating the pressure of said ignition chamber from the pressure within said U.V. detector.

15. The torch igniter of claim 14 wherein said swirler is disposed along the axis of propagation of the detected U.V. radiation intermediate said ignition chamber and said gas-tight U.V. transmissive window.

16. In a method for torch igniting a gas turbine combuster operating at above atmospheric pressure and for detecting the existence of flame in a torch igniter and of flame in the ignited combustor, the steps of:
flowing a swirling stream of torch air through a fluid passageway and inducting and expanding the swirling stream into an ignition chamber;
mixing torch fuel into the swirling stream of torch air in said ignition chamber;
selectively igniting the mixed stream of torch air and torch fuel to provide a torch flame, and exhausting the combustion products and torch flame from said ignition chamber through the wall of a combustion chamber into a combustion zone within the combustion chamber to ignite a combustion flame;
passing U.V. radiation emanating from the torch and combustor flames back through said fluid passageway and a gas tight U.V. radiation transmissive window to a U.V. detector;
scrubbing the combustion side of said window with the swirling flow of torch air;
shutting off the torch flame in the ignition chamber; and
detecting U.V. radiation from said combustion flame, if any, at said detector.

* * * * *